UNITED STATES PATENT OFFICE.

SAMUEL P. SADTLER, OF PHILADELPHIA, PENNSYLVANIA, ASSIGNOR TO HENRY K. HESS, OF SAME PLACE.

PROCESS OF MAKING CHROMATES.

SPECIFICATION forming part of Letters Patent No. 599,197, dated February 15, 1898.

Application filed August 13, 1897. Serial No. 648,164. (No specimens.)

*To all whom it may concern:*

Be it known that I, SAMUEL P. SADTLER, a citizen of the United States, residing in Philadelphia, Pennsylvania, have invented certain Improvements in the Regeneration of Chromates or Bichromates from Sesqui Salts of Chromium, of which the following is a specification.

In the action of primary batteries in which a bichromate-like bichromate of potash or soda and free sulfuric acid are used the chemical action which results in the production of a current has the effect of reducing the bichromate of potash or soda to green chromium sulfate, which frequently crystallizes out in the form of chrome-alum in these battery solutions.

My object is to take the waste liquor of these batteries, or the chrome-alum which is its main ingredient, and from it to regenerate the more valuable bichromate of potash or soda for new utilization. It will be understood, however, that my invention is not limited to the regeneration of bichromate of potash or soda from waste battery liquid, but may be applied to the green chromium compounds corresponding to those produced in this battery action. This object I attain in the following manner:

In regenerating the bichromate of potash or soda from the waste liquor of a primary battery, in which bichromate of potash or soda is originally used, and where sulfuric acid is present in excess, I proceed in the following manner: I first add milk of lime, because a large excess of free acid in these chrome liquors, even when neutralized with caustic soda or potash, still remains in the solution as sulfate of soda or sulfate of potash, which salts interfere with the subsequent crystallization of the bichromate. Therefore I have found it much more advantageous to neutralize the free sulfuric acid with slaked lime in thin cream, known as "milk of lime," as I then remove both the sulfuric acid and the lime in the form of insoluble sulfate of lime. Slaked lime is, moreover, the cheapest possible material that could be chosen to neutralize the free acid, so necessary for economical use of the oxidizing agent.

In carrying out the process I add milk of lime as long as the white precipitate of sulfate of lime forms or until litmus test-paper shows that the acid reaction has disappeared and the solution has become neutral. It must not be added in excess or to alkaline reaction, as the chromium hydrate then begins to be thrown out, and the bleaching-powder does not act readily in alkaline solution; but with the solution just neutral or still faintly acid the bleaching-powder, which I use as oxidizing agent, can be added. This begins its oxidizing action already in the cold, but is aided by heat. The separated calcium sulfate from the neutralization of the free sulfuric acid need not be filtered off before beginning the oxidation with the bleaching-powder, as this causes the formation of additional quantities of calcium sulfate, being itself a calcium compound.

In carrying out the process I first prepare the solution, if strongly acid, by the use of milk of lime and then oxidize the reduced chromium salt by the action of calx chlorata, *United States Pharmacopœia*, known commonly as "bleaching - powder," (chlorid of lime.) Bleaching-powder has long been known as an energetic oxidizing agent, and the possibility of its oxidizing green chromium oxid or hydrate has also been noticed by writers, but the application of this oxidizing agent for this useful purpose of generating a valuable product as bichromate of potash or soda and the detailed methods of its application are, as far as I know, new, and it seems to be the most efficient means for converting the relatively little valuable green chromium compounds into the chromates from which they originally were formed and which are of considerable value as commercial products. After this oxidizing is completed calcium sulfate, which has formed, is filtered off, and the solution is concentrated down to the point of crystallization. Bichromate of potash or soda can then be crystallized out and, if necessary, purified by recrystallization to free it from any sulfate of zinc which may have been in the original solution. Purification is not necessarily considered part of this special process.

In case solid chrome-alum, which frequently separates out in battery-cells, or any of the green salts known as "sesqui salts of chromium," is available as a starting-point the previous treatment with milk of lime is not necessary, but such salts can be at once dissolved and acted upon in a concentrated solution by the bleaching-powder.

In the waste liquor, which was taken for the following quantitative tests, besides the chrome-alum there were present sulfate of zinc, sulfate of soda, and considerable free sulfuric acid as impurities. As an illustration I may give two quantitative experiments which were made to ascertain the relative amounts of bleaching-powder required, according to whether milk of lime was or was not used previously to effect neutralization of the free sulfuric acid. One hundred grams of the chrome solution containing the impurities mentioned above, representing 13.42 grams of $CrO_3$, (corresponding to 19.74 grams of potassium bichromate,) after neutralization of the free acid, required for oxidation 38.04 grams of a bleaching-powder containing twenty-eight per cent. of available chlorin. On the other hand, one hundred grams of the same solution oxidized with the same bleaching-powder without previous neutralization of the free acid required 58.68 grams of the material. So as slaked lime is cheaper than bleaching-powder it is obviously economy to follow the method outlined. The above figures show, however, that 38.04 parts of bleaching-powder of twenty-eight-per-cent. strength will regenerate 19.47 parts of bichromate of potash. The reaction obtained is as follows:

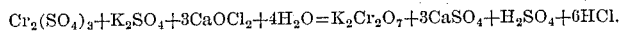

$$Cr_2(SO_4)_3 + K_2SO_4 + 3CaOCl_2 + 4H_2O = K_2Cr_2O_7 + 3CaSO_4 + H_2SO_4 + 6HCl.$$

It will be seen that the process described above for regeneration of bichromate involves only the cheapest of chemicals, and therefore regeneration of bichromate of potash or soda in this way appears to be an economical and practical method.

I may regenerate bichromate from other waste products having the green chromium compounds which result from the reduction of chromates, whether in the solid form or in solution, and a simple chromium salt, or the double salt, known as "chromium alum," or liquors containing them, may form the starting-point.

I do not wish to claim the use of bleaching-powder in a broad sense for the oxidation of a lower oxid of chromium to a higher one, but to the specific treatment of chrome-alum and liquids containing the same for the production of alkaline bichromates, such as potassium or sodium bichromate.

I claim as my invention—

1. In the manufacture or regeneration of chromates or bichromates, the herein-described process consisting in subjecting the green salts known as "sesqui salts of chromium" to the action of the substance known commercially as "bleaching-powder," (calx chlorata.)

2. In the manufacture or regeneration of chromates or bichromates, the herein-described process consisting in subjecting waste liquors containing green chromium salt to the action of the substance known commercially as "bleaching-powder," (calx chlorata.)

3. The process herein described of regenerating bichromates or chromates from waste liquors in which free sulfuric acid is present, said process consisting in first adding to the said liquor milk of lime to neutralize the free acid, then oxidizing the chromium compound present to a chromate or bichromate by the use of the substance known as "bleaching-powder" (calx chlorata).

4. The process herein described of regenerating bichromates or chromates from waste liquors in which free sulfuric acid is present, said process consisting in first adding to the said liquor milk of lime to neutralize the free acid, then oxidizing the chromium compound present to a chromate or bichromate by the use of the substance known as "bleaching-powder" (calx chlorata), and finally in connection with the preceding steps, the obtaining of the chromate by concentration of the solution after filtering the sulfate of lime and crystallizing or recrystallizing as is necessary to free it from the accompanying impurities.

In testimony whereof I have signed my name to this specification in the presence of two subscribing witnesses.

SAMUEL P. SADTLER.

Witnesses:
HENRY HOWSON,
JOS. H. KLEIN.